(12) United States Patent
Sharma

(10) Patent No.: US 8,582,725 B2
(45) Date of Patent: *Nov. 12, 2013

(54) TESTING AND QUALITY ASSURANCE OF INTERACTIVE VOICE RESPONSE (IVR) APPLICATIONS

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/208,131

(22) Filed: Aug. 11, 2011

(65) Prior Publication Data

US 2011/0293076 A1 Dec. 1, 2011

Related U.S. Application Data

(63) Continuation of application No. 11/558,763, filed on Nov. 10, 2006, now Pat. No. 8,009,811.

(51) Int. Cl.
*H04M 1/64* (2006.01)
(52) U.S. Cl.
USPC ............... 379/88.04; 370/351; 379/10.01; 379/88.01
(58) Field of Classification Search
USPC .......................... 370/351–356; 379/1.01–35, 379/67.1–88.28, 1.01–31; 704/270–278; 709/201–207, 217–248; 348/14.01–14.16
See application file for complete search history.

(56) References Cited

U.S. PATENT DOCUMENTS

| | | |
|---|---|---|
| 5,557,539 A | 9/1996 | Fitch |
| 5,740,233 A | 4/1998 | Cave et al. |
| 6,292,909 B1 * | 9/2001 | Hare ............................... 714/40 |
| 6,477,492 B1 | 11/2002 | Connor |
| 6,516,051 B2 * | 2/2003 | Sanders ..................... 379/10.03 |
| 6,587,543 B1 | 7/2003 | Howard et al. |
| 6,912,581 B2 | 6/2005 | Johnson et al. |
| 6,920,425 B1 | 7/2005 | Will et al. |
| 7,054,939 B2 | 5/2006 | Koch et al. |
| 7,080,315 B1 | 7/2006 | Lucas et al. |
| 7,117,158 B2 | 10/2006 | Weldon et al. |
| 7,210,098 B2 | 4/2007 | Sibal et al. |
| 7,224,776 B2 | 5/2007 | Creamer et al. |
| 7,734,470 B2 * | 6/2010 | Natesan ......................... 704/270 |
| 7,924,986 B2 * | 4/2011 | Sadowski et al. ........... 379/88.18 |
| 8,009,811 B2 * | 8/2011 | Sharma ..................... 379/88.04 |
| 8,229,080 B2 * | 7/2012 | Sharma ..................... 379/88.04 |
| 2002/0077819 A1 | 6/2002 | Girardo |
| 2003/0182366 A1 | 9/2003 | Baker et al. |
| 2003/0212561 A1 | 11/2003 | Williams et al. |
| 2004/0008825 A1 | 1/2004 | Seeley et al. |
| 2005/0047556 A1 | 3/2005 | Somerville et al. |
| 2005/0080629 A1 | 4/2005 | Attwater et al. |
| 2007/0071220 A1 | 3/2007 | Weldon et al. |

* cited by examiner

*Primary Examiner* — Hemant Patel

(57) ABSTRACT

A system receives a condition for an interactive voice response (IVR) application, automatically tests the IVR application based on the received condition, and generates a test result based on the automatic testing of the IVR application.

20 Claims, 12 Drawing Sheets

TESTING AND QUALITY ASSURANCE OF INTERACTIVE VOICE RESPONSE (IVR) APPLICATIONS

RELATED APPLICATION

This application is a continuation of U.S. patent application Ser. No. 11/558,763, filed Nov. 10, 2006, the disclosure of which is incorporated by reference herein in its entirety.

BACKGROUND INFORMATION

Interactive voice response (IVR) refers to a computerized system that allows a user, typically a telephone caller, to select an option from a voice menu or otherwise interface with a computer system. Generally, the system plays pre-recorded voice prompts to which the user responds by either pressing a number on a telephone keypad or speaking to the system.

Voice extensible markup language ("VoiceXML" or "VXML") is an open standard developed by the World Wide Web Consortium (W3C) for IVR applications. An IVR application user interface may be documented in a portion (e.g., a dialog design portion) of a design document (e.g., a Service Design Document or "SDD"). A SDD may include an application summary, application call flows, application specification requirements, and a dialog design for an IVR application. The dialog design portion of the SDD may be used to show what the IVR application will do and how it will behave. The dialog design portion may be used to build the IVR application in the form of VXML documents. The VXML documents may include VXML elements that conform to the specifications recommended by W3C.

The success of an IVR application may depend on how rigorously a speech application has been tested and quality assured. Typically, IVR applications are tested by humans (e.g., quality assurance (QA) testers). The testers may follow the specifications recommended by the W3C for a particular version of VXML (e.g., VoiceXML 2.0 and/or 2.1) when testing IVR applications. Such testers generally create a matrix of VXML elements for each dialog state in order to test an IVR application, and test the integrity of the IVR application with the VXML elements. For example, most of the dialog states may be manually tested for noinput, nomatch, and help events. However, such manual testing and quality assurance is time consuming, tedious, and expensive.

DETAILED DESCRIPTION

The following detailed description refers to the accompanying drawings. The same reference numbers in different drawings may identify the same or similar elements. Also, the following detailed description does not limit the invention.

Implementations described herein may provide systems and methods for automatic testing and/or quality assurance of an IVR application. For example, in one implementation, a telephone (or phone) number to be called for accessing the IVR application, and a date and/or time to start performance of testing and/or QA of the IVR application may be provided (e.g., by a user) into a system for automatic testing and/or QA of an IVR application. Conditions for testing and/or QA of the IVR application may also be provided into the system and stored as, e.g., documents. The conditions may be provided by using a call flow diagram, and/or by providing the name of each dialog state. VXML elements to be tested for each dialog state of the IVR application may be pre-defined and provided into the system. The system may call the provided phone number and may automatically perform testing and/or QA (e.g., may automatically test the dialog states for events, hang-ups, routine maintenance, etc.). The system may generate a log of any issues encountered during testing/QA of the IVR application, and may notify (e.g., the user) of the testing/QA results of the IVR application. Automatic testing/QA of IVR applications may help reduce the time and cost required to perform testing and/or QA of IVR applications.

A "VXML element," as the term is used herein, is to be broadly interpreted to include any VXML element (e.g., command) capable of being used in a VXML document. For example, the following VXML elements may be used in VoiceXML 2.0 and/or 2.1: <assign>, <audio>, <block>, <break>, <catch>, <choice>, <clear>, <data>, <disconnect>, <else>, <elseif>, <emphasis>, <enumerate>, <error>, <example>, <exit>, <field>, <filled>, <foreach>, <form>, <goto>, <grammar>, <help>, <if>, <initial>, <item>, <link>, <log>, <mark>, <menu>, <meta>, <noinput>, <nomatch>, <object>, <one-of >, <option>, <paragraph>, <param>, <phoneme>, <prompt>, <property>, <prosody>, <record>, <reprompt>, <return>, <rule>, <ruleref>, <say-as>, <script>, <send>, <sentence>, <sub>, <subdialog>, <submit>, <tag>, <throw>, <token>, <transfer>, <value>, <var>, and <vxml>.

A "document," as the term is used herein, is to be broadly interpreted to include any machine-readable and machine-storable work product. A document may include, for example, a file, a combination of files, one or more files with embedded links to other files, etc. In the context of the Internet, a common document is a web page. Web pages often include textual information and may include embedded information (such as meta information, images, hyperlinks, etc.) and/or embedded instructions (such as Javascript, etc.).

Figure 1:
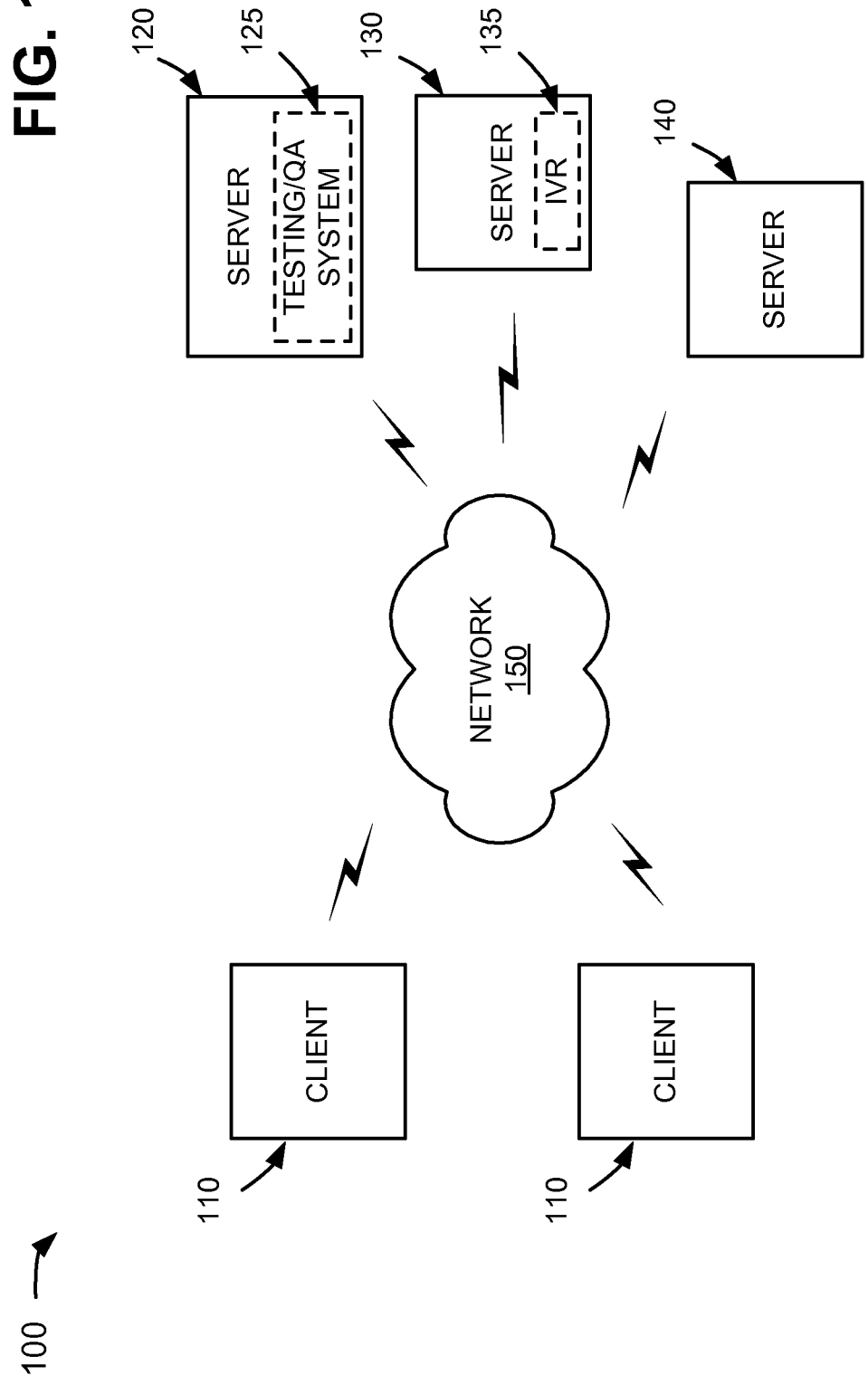
FIG. 1 depicts an exemplary network in which systems and methods described herein may be implemented.

FIG. 1 depicts an exemplary network 100 in which systems and methods described herein may be implemented. As shown, network 100 may include multiple clients 110 connected to multiple servers 120-140 via a network 150. Network 150 may include, for example, a local area network (LAN), a wide area network (WAN), a telephone network, such as the Public Switched Telephone Network (PSTN), an intranet, the Internet, or a combination of networks. Two clients 110 and three servers 120-140 have been illustrated as connected to network 150 for simplicity. In practice, there may be more or fewer clients and servers. Also, in some instances, a client may perform one or more functions of a server and/or a server may perform one or more functions of a client.

Clients 110 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 120-140 may include server entities that gather, process, search, and/or maintain documents. Clients 110 and servers 120-140 may connect to network 150 via wired, wireless, and/or optical connections.

Server 120 may include a system 125 for automatic testing and/or QA of an IVR application 135. IVR application 135 may be provided, for example, within server 130. In another implementation, server 120 may include testing/QA system 125 and IVR application 135. In still another implementation, client 110 may include testing/QA system 125. In still a further implementation, testing/QA system 125 may be provided on server 120 and may be useable by clients 110. While servers 120-140 are shown as separate entities, it may be possible for one or more of servers 120-140 to perform one or more of the functions of another one or more of servers 120-240. For example, it may be possible that two or more of servers 120-140 are implemented as a single server. It may also be possible for a single one of servers 120-140 to be implemented as two or more separate (and possibly distributed) devices.

Figure 2:
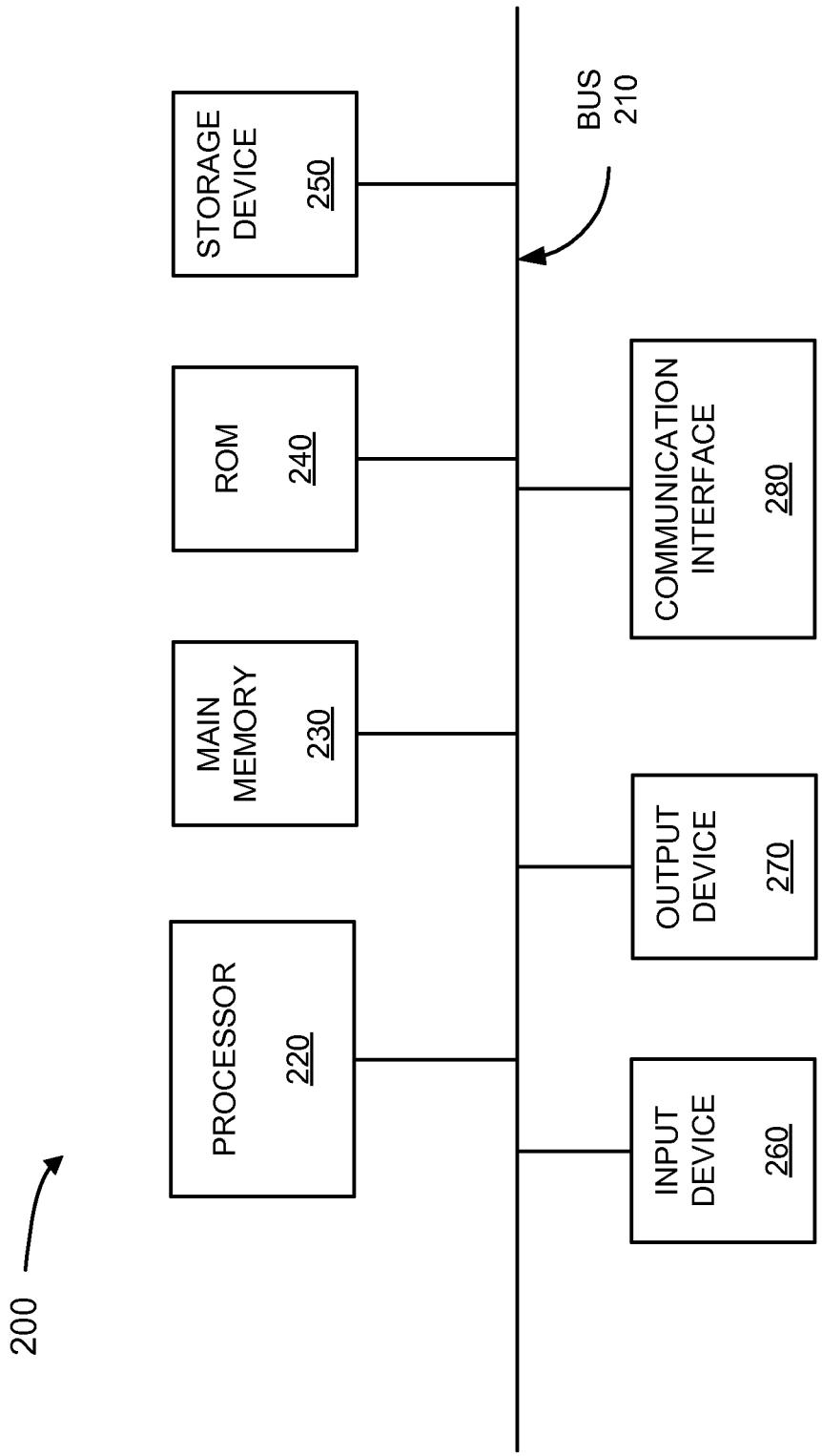
FIG. 2 depicts an exemplary device, client or server, configured to communicate via the exemplary network of FIG. 1.

FIG. 2 is an exemplary diagram of a device 200 that may be used with embodiments of the invention. A device may be defined as a personal computer, a wireless telephone, a personal digital assistant (PDA), a lap top, or another type of computation or communication device. Device 200 may correspond to one or more of clients 110 and servers 120-140 shown in FIG. 1.

Device 200 may include a bus 210, a processor 220, a main memory 230, a read only memory (ROM) 240, a storage device 250, an input device 260, an output device 270, and a communication interface 280. Other configurations are also possible. Bus 210 may include a path that permits communication among the elements of device 200.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As will be described in detail below, device 200 may perform certain operations to test and/or provide quality assurance of an IVR application (e.g., IVR application 135). Device 200 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
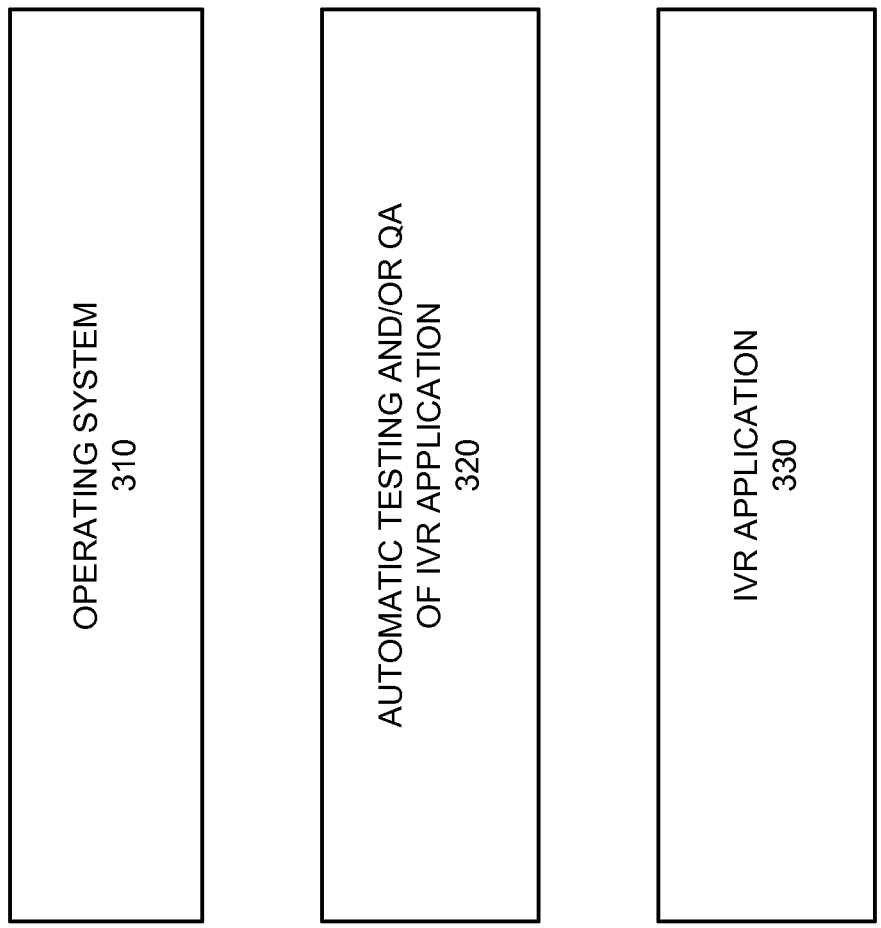
FIG. 3 is a diagram of a portion of an exemplary computer-readable medium that may be used by the device of FIG. 2.

FIG. 3 is a diagram of a portion of an exemplary computer-readable medium 300 that may be used by a device, such as device 200. In one implementation, computer-readable medium 300 may correspond to memory 230 of device 200. The portion of computer-readable medium 300 illustrated in FIG. 3 may include an operating system 310, automatic testing and/or QA of an IVR application software 320, and IVR application software 330. Automatic testing/QA software 320 and/or IVR application software 330 may be included in operating system 310 or may be separate from operating system 310. Automatic testing/QA software 320 may be included in IVR application software 330 or may be separate from IVR application software 330.

Operating system 310 may include operating system software, such as the Microsoft Windows, Apple MAC OS, Linux, Unix, IBM OS/2, and/or operating systems for personal digital assistants, cell phones, or other types of computation or communication devices.

Automatic testing/QA software 320 may include an executable object or process. Device 200 may obtain the executable object or process from a server or from a disk, tape, network, CD-ROM, etc. Alternatively, the executable object or process may be pre-installed on device 200.

Automatic testing/QA software 320 may permit automatic testing and/or performance of QA on an IVR application. Automatic testing/QA software 320 may be automatically activated upon initiation of operating system 310. Alternatively, automatic testing/QA software 320 may be activated when instructed by a user. In either case, automatic testing/QA software 320 may permit testing and/or QA on an IVR application, as will be described below.

IVR application software 330 may include an executable object or process. Device 200 may obtain the executable object or process from a server or from a disk, tape, network, CD-ROM, etc. Alternatively, the executable object or process may be pre-installed on device 200.

IVR application software 330 may include software that allows a user, typically a telephone caller, to select an option from a voice menu or otherwise interface with a computer system. IVR application software 330 may play pre-recorded voice prompts to which the user responds by either pressing a number on a telephone keypad or speaking to the system. IVR application software 330 may operate in conjunction with automatic testing/QA software 320, and enable testing/QA of IVR application software 330 by automatic testing/QA software 320. In another implementation, IVR application software 330 may be a process separate from operating system 310 and/or automatic testing/QA software 320. In this latter implementation, IVR application software 330 (e.g., IVR application 135) may be provided on a device (e.g., server 130) separate from a device that includes automatic testing/QA software 320, but may interact with automatic testing/QA software 320, e.g., via network 150.

IVR application software 330 may be automatically activated upon initiation of automatic testing/QA software 320. Alternatively, IVR application software 330 may be activated when instructed by a user. In either case, IVR application software 330 may permit testing and/or performance of QA by automatic testing/QA software 320, as will be described below.

Figure 4:
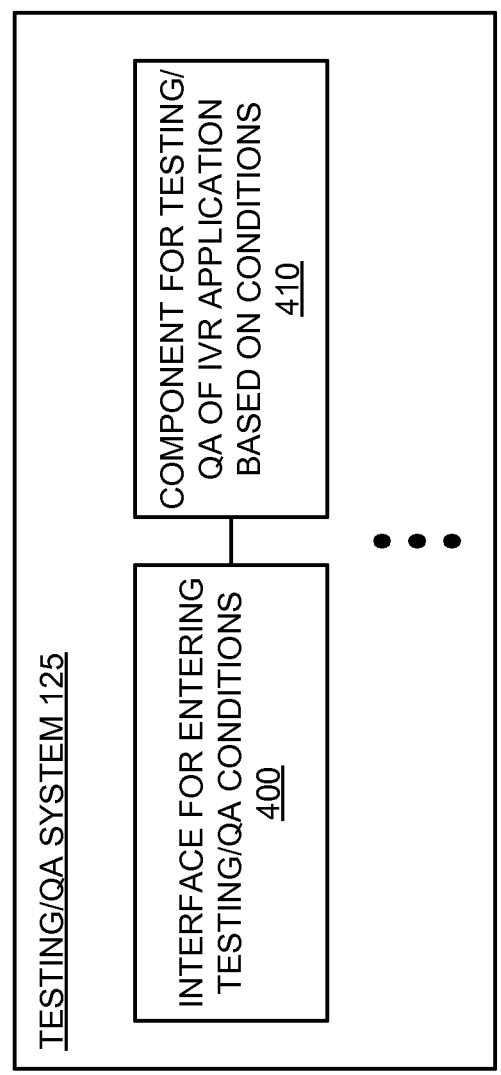
FIG. 4 is a functional diagram of an exemplary system for automatic testing and/or quality assurance of an IVR application.

FIG. 4 is a functional diagram of testing/QA system 125. According to one implementation, one or more of the functions of testing/QA system 125, as described below, may be performed by a device (e.g., device 200). According to another implementation, one or more of these functions of testing/QA system 125 may be performed by an entity separate from device 200, such as a computer associated with device 200.

As shown in FIG. 4, testing/QA system 125 may include an interface 400 for providing testing/QA conditions for an IVR application, and a component 410 for performing testing/QA of the IVR application based on the testing/QA conditions provided with interface 400. In one example, interface 400 may be a graphical user interface (GUI) that may allow a user to provide conditions for testing and/or QA of an IVR application. In another example, interface 400 may allow a user to provide conditions for testing and/or QA of an IVR application via speech. In still another example, interface 400 may allow a user to provide conditions for testing and/or QA of an IVR application via command line instructions.

Interface 400 may be accessed in a variety of ways. For example, interface 400 may be accessed remotely using a web browser (e.g., Internet Explorer, Netscape, Firefox, etc.) provided on, e.g., client 110. In another example, interface 400 may be accessed remotely, e.g., on handheld devices such as cell phones, PDAs, etc. In still another example, interface 400 may be accessed using a telephone. In a further example, interface 400 may be accessed as a stand alone application on a device (e.g., device 200).

Testing/QA component 410 may include a variety of components that perform testing/QA of an IVR application. Testing/QA component 410 is further described below in connection with FIGS. 8 and 9.

Although FIG. 4 shows two components of testing/QA system 125, in other implementations, testing/QA system 125 may include fewer or more components than depicted in FIG. 4.

Figure 5:
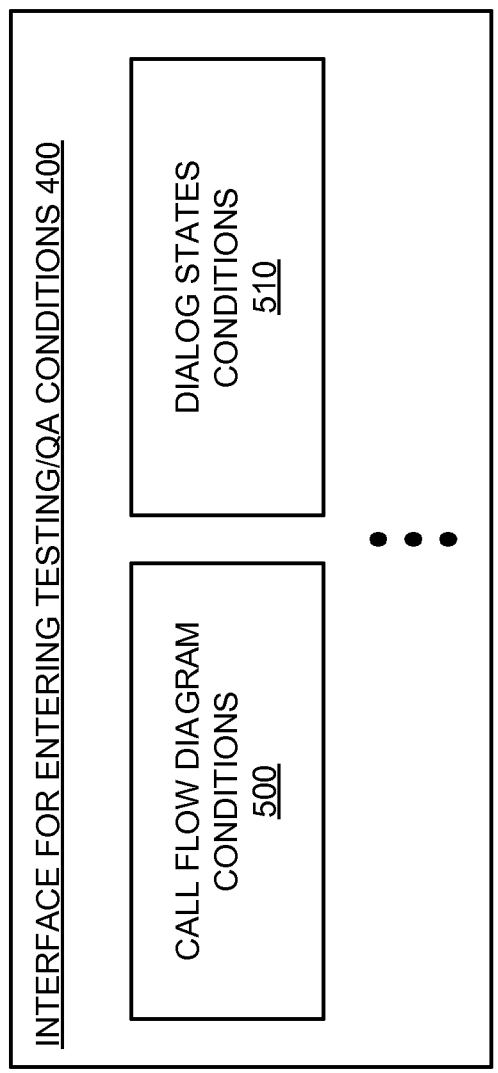
FIG. 5 is a functional diagram of an interface for providing testing/QA conditions of the system of FIG. 4.

FIG. 5 is a functional diagram of interface 400 for providing testing/QA conditions of testing/QA system 125. As shown, a user may provide a variety of testing/QA conditions, e.g., call flow diagram conditions 500 and/or dialog states conditions 510. Call flow diagram conditions 500 may include a call flow diagram that describes the dialog states to be reviewed during the testing/QA of an IVR application. Dialog states conditions 510 may include the name of each dialog state to be reviewed during the testing/QA of an IVR application. Dialog states conditions 510 may also include VXML elements to be tested for each dialog state.

Although FIG. 5 shows two types of conditions that may be provided via interface 400, in other implementations, fewer or more conditions than depicted in FIG. 5 may be provided via interface 400. Furthermore, although FIG. 5 shows call flow conditions 500 and dialog states conditions 510 as being separate, in other implementations, any combination of call flow conditions 500 and dialog states conditions 510 may be provided via interface 400.

Figure 6:
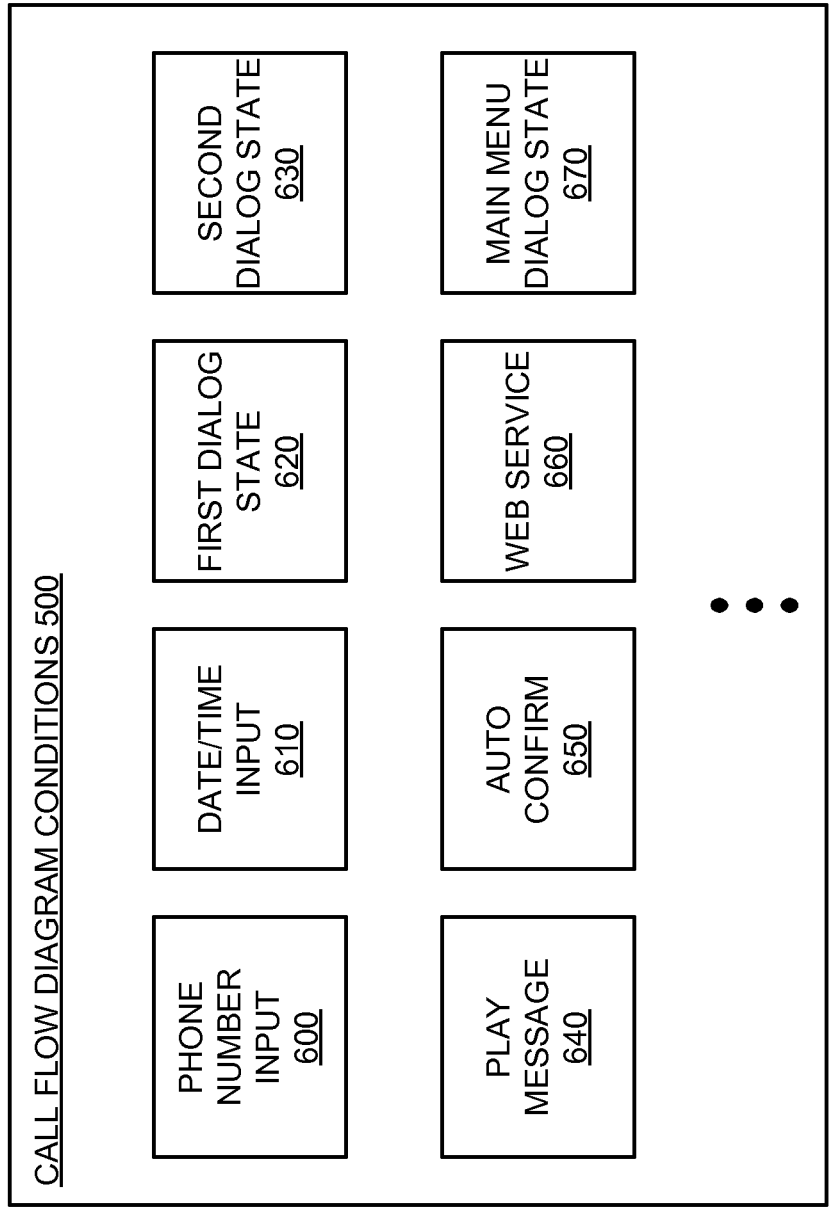
FIG. 6 is a diagram of exemplary call flow diagram conditions capable of being provided by the interface of FIG. 5.

FIG. 6 is a diagram of exemplary call flow diagram conditions 500 that may be provided via interface 400. As shown, a variety of call flow diagram conditions 500 may be provided, e.g., a phone number input 600, a date/time input 610, a first dialog state 620, a second dialog state 630, a play message 640, an auto confirm 650, a web service 660, a main menu dialog state 670, etc.

Phone number input 600 may include the telephone number to call for testing and/or QA of an IVR application. In other words, the telephone number may provide access to the IVR application. For example, a user may provide phone number input 600, and testing/QA component 410 may call the telephone number provided by phone number input 600 in order to access the IVR application and perform testing/QA thereon.

Date/time input 610 may include a date and/or a time indicating when to start testing and/or QA of the IVR application. For example, a user may provide date/time input 610, and testing/QA component 410 may perform testing/QA of the IVR application at the date and/or time specified by date/time input 610.

First dialog state 620 may include a first dialog state of the IVR application for testing/QA. For example, a user may provide first dialog state 620 of the IVR application (e.g., "MainMenuOfficer" may be a first dialog state where the user wants an automatic speech input of "Enroll Officer"), and testing/QA component 410 may speech input "Enroll Officer" when first dialog state 620 of the IVR application is accessed.

Second dialog state 630 may include a second dialog state of the IVR application for testing/QA. For example, a user may provide second dialog state 630 of the IVR application (e.g., "EntryOfficerId" may be a second dialog state where the user wants an automatic speech input of digits for "officer identification"), and testing/QA component 410 may speech input a predetermined number of digits (e.g., as defined by the user) when second dialog state 630 of the IVR application is accessed.

Play message 640 may include an audio message to be played when a predetermined error condition occurs. For example, testing/QA component 410 may test VXML events (e.g., noinput, nomatch, help, etc.) for a dialog state (e.g., for second dialog state "EntryOfficerId), and may activate play message 640 when a predetermined error condition occurs (e.g., after a maximum number of error conditions is exceeded).

Auto confirm 650 may include a mechanism to automatically confirm whether input information (e.g., provided by testing/QA component 410) is correct. For example, testing/QA component 410 may automatically speech/key pad input the digits for the second dialog state "EntryOfficerId," and auto confirm 650 may automatically confirm whether the digits are correct. If auto confirm 650 determines that the digits are incorrect, testing/QA component 410 may return to second dialog state 630 and may request re-input of the digits for the second dialog state "EntryOfficerId." Otherwise, testing/QA component 410 may invoke web service 660.

Web service 660 may include a mechanism to invoke a web service, if requested by the user, for validation. For example, testing/QA component 410 may invoke web service 660 to determine whether the digits entered in the second dialog state "EntryOfficerId" is "registered" or "not registered" with the IVR application. If web service 660 determines that the digits entered in the second dialog state "EntryOfficerId" is "not registered," testing/QA component 410 may return to second dialog state 630 and may request re-entry of the digits for the second dialog state "EntryOfficerId." If web service 660 determines that the digits entered in the second dialog state "EntryOfficerId" is "registered," testing/QA component 410 may invoke main menu dialog state 670.

Main menu dialog state 670 may include a main menu dialog state of the IVR application. For example, the main menu dialog state may request user identification information (e.g., account information, user name, a personal identification number (PIN), etc.).

Although FIG. 6 shows exemplary call flow diagram conditions 500 that may be provided via interface 400, in other implementations, fewer or more call flow diagram conditions than depicted in FIG. 6 may be provided via interface 400. For example, although two dialog states (e.g., first dialog state 620 and second dialog state 630) are shown in FIG. 6, in other implementations any number of dialog states may be received via interface 400.

Figure 7:
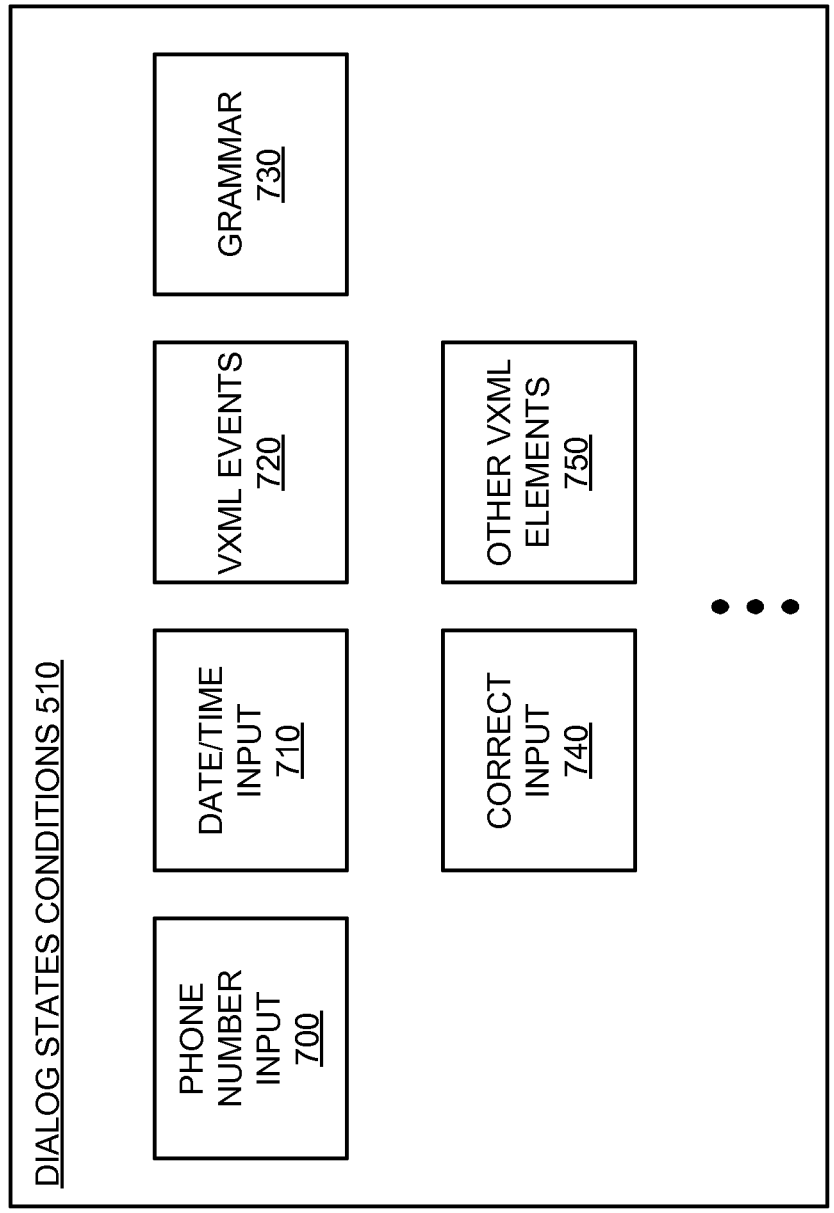
FIG. 7 is a diagram of exemplary dialog states conditions capable of being provided by the interface of FIG. 5.

FIG. 7 is a diagram of exemplary dialog states conditions 510 that may be provided via interface 400. As shown, a variety of dialog states conditions 510 may be provided, e.g., a phone number input 700, a date/time input 710, VXML events 720, grammar 730, correct input 740, other VXML elements 750, etc.

Phone number input 700 may include the telephone number to call for testing and/or QA of an IVR application. In other words, the telephone number may provide access to the IVR application. For example, a user may provide phone number input 700, and testing/QA component 410 may call the telephone number provided by phone number input 700 in order to access the IVR application and perform testing/QA thereon.

Date/time input 710 may include a date and/or a time indicating when to start testing and/or QA of the IVR application. For example, a user may provide date/time input 710, and testing/QA component 410 may perform testing/QA of the IVR application at the date and/or time specified by date/time input 710.

The user may have the option of inputting a name of a dialog state from where testing/QA component 410 may begin testing/QA of the IVR application. For example, the user may provide the name of VXML events 720, grammar 730, correct input 740, other VXML elements 750, etc. If no name for a dialog state is provided by a user, testing/QA component 410 may start from a default first dialog state reached by calling the telephone number provided by phone number input 700.

VXML events 720 may include the names of VXML events (e.g., noinput, nomatch, help, etc.) for testing/QA by component 410. For example, a user may provide the names of VXML events 720, via interface 400, and testing/QA component 410 may perform testing/QA on VXML events 720. The user may also specify, via interface 400, the location of speech input (e.g., the names of audio files to be used for a nomatch events, noinput events, etc.) for VXML events 720. Testing/QA component 410 may perform testing/QA on VXML events 720 using the user-defined inputs for VXML events 720. If the user does not specify the names of VXML events 720 to be tested for a dialog state, testing/QA component 410 may perform testing/QA for default events (e.g., noinput events, nomatch events, etc.), and may provide synthetic speech as the input for the default events.

Grammar 730 may include user-defined (e.g., via interface 400) grammar to be used for a dialog state. For example, grammar 730 may include customized grammar (e.g., the grammar used to define a type of flower may be customized to include a rose, a tulip, etc.). In another example, the user may specify, via interface 400, the location of an input (e.g., where a recorded input is stored) for grammar 730. Testing/QA component 410 may perform testing/QA using the user-defined inputs for grammar 730. If no customized grammar is specified, testing/QA component 410 may perform testing/QA for default grammar (e.g., as specified in the dialog state), and may provide synthetic speech as the input for the default grammar.

Correct input 740 may include user-defined (e.g., via interface 400) correct input for a dialog state. For example, correct input 740 may include a correct input for VXML events 720, grammar 730, other VXML elements 740, etc. Testing/QA component 410 may perform testing/QA for correct input 740 using the user-defined correct inputs for dialog states. If no correct input 740 is defined, testing/QA component 410 may perform testing/QA for a default correct input.

Other VXML elements 750 may include any of the VXML elements defined previously and/or other VXML elements used in an IVR application. For example, the user may specify other types of inputs of an IVR application as other VXML elements 750, and testing/QA component 410 may perform testing/QA on other VXML elements 750.

Although FIG. 7 shows exemplary dialog states conditions 510 that may be provided via interface 400, in other implementations, fewer or more dialog states conditions than depicted in FIG. 7 may be provided via interface 400.

Figure 8:
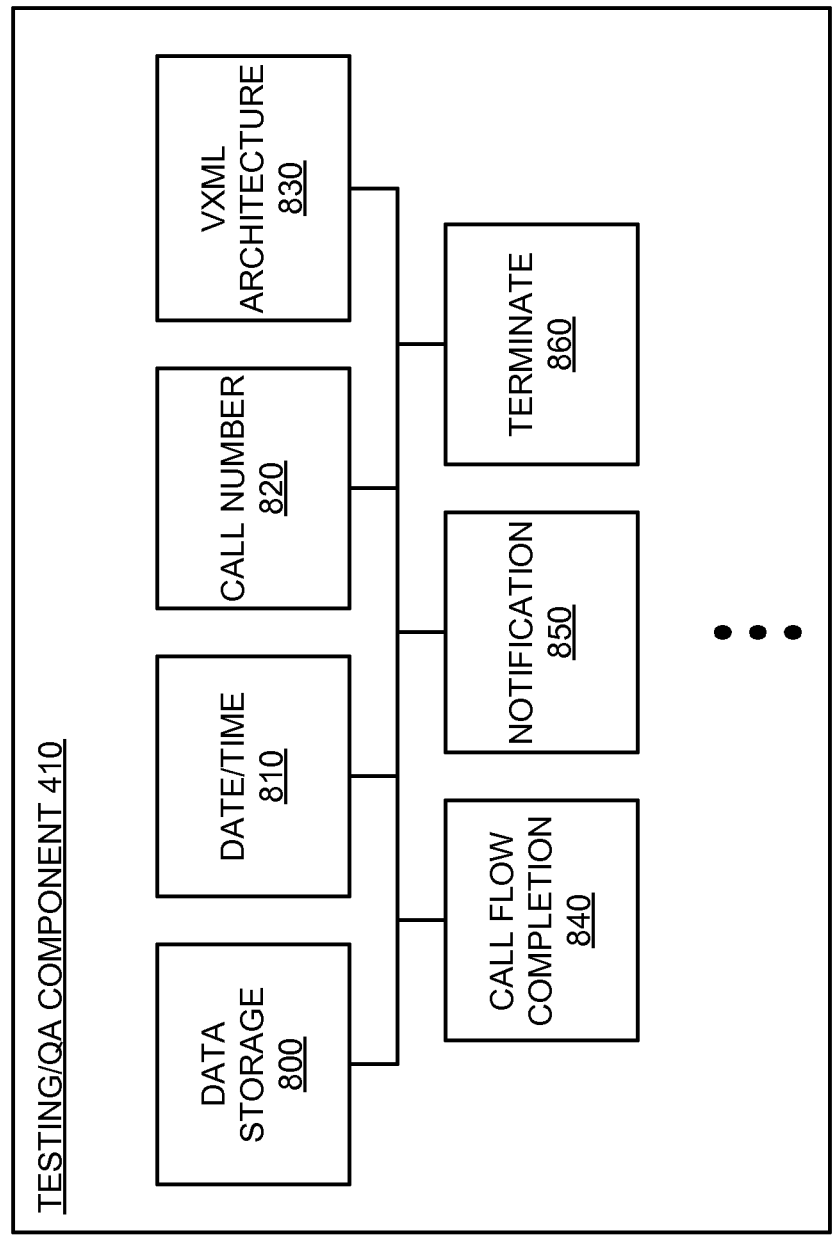
FIG. 8 is a functional diagram of a component for performing testing/QA of an IVR application of the system of FIG. 4.

FIG. 8 is a functional diagram of testing/QA component 410 of testing/QA system 125. As shown, component 410 may include a variety of components, e.g., a data storage component 800, a date/time component 810, a call number component 820, a VXML architecture component 830, a call flow completion component 840, a notification component 850, a terminate component 860, etc.

Data storage component 800 may include any type of memory device (e.g., main memory 230, read only memory (ROM) 240, and/or storage device 250 of device 200). Data storage component 800 may provide storage for the testing/QA conditions provided by a user via interface 400, as described above in connection with FIGS. 4-7. The testing/QA conditions may be stored in a variety of ways. For example, the testing/QA conditions may be stored as files (e.g., a Microsoft Word document, a Microsoft Excel document, a Comma Separate file, etc.), and/or as a database management types (e.g., relational, object oriented, network, hierarchical, file system-based, etc.).

Date/time component 810 may retrieve the date and time provided by a user (e.g., date/time inputs 610 and 710) from data storage 800. Date/time component 810 may begin performance of testing/QA of an IVR application at the provided date and time.

If testing/QA component 410 begins testing/QA of the IVR application as specified by date/time component 810, call number component 820 may retrieve the telephone number to be called for the IVR application (e.g., phone number input 600 or 700) from data storage 800. Call number component 820 may also initiate the telephone call to the IVR application using the retrieved telephone number.

VXML architecture component 830 may include the exemplary components shown in FIG. 9 and described below. VXML architecture component 830 may retrieve the exemplary components of FIG. 9 from data storage 800.

Call flow completion component 840 may be executed if testing/QA component 410 has accessed the predetermined dialog states and performed testing/QA using the conditions provided by the user. If executed, call flow completion component 840 may check that the conditions provided by the user for the IVR application have been tested.

Notification component 850 may provide notification of the results of the testing/QA of the IVR application as determined by testing/QA component 410. Notification component 850 may provide such notification in a variety of ways (e.g., via an email, a voicemail, a telephone call, a page, a text message (e.g., instant message (IM) or short message service (SMS)), a facsimile, etc.). The user may specify the level of detail provided in the notification. The notification, for example, may selectively provide a record of every transaction performed on the IVR application, a record of problems that were encountered during the testing/QA of the IVR application, and/or an indication of whether or not the testing/QA of the IVR application was successful.

After notification component 850 provides notification of the results of the testing/QA of the IVR application, terminate component 860 may end the telephone call with the IVR application and may end performance of testing/QA of the IVR application by testing/QA component 410.

Although FIG. 8 shows exemplary components of testing/QA component 410, in other implementations, fewer or more components than depicted in FIG. 8 may be provided for testing/QA component 410.

Figure 9:
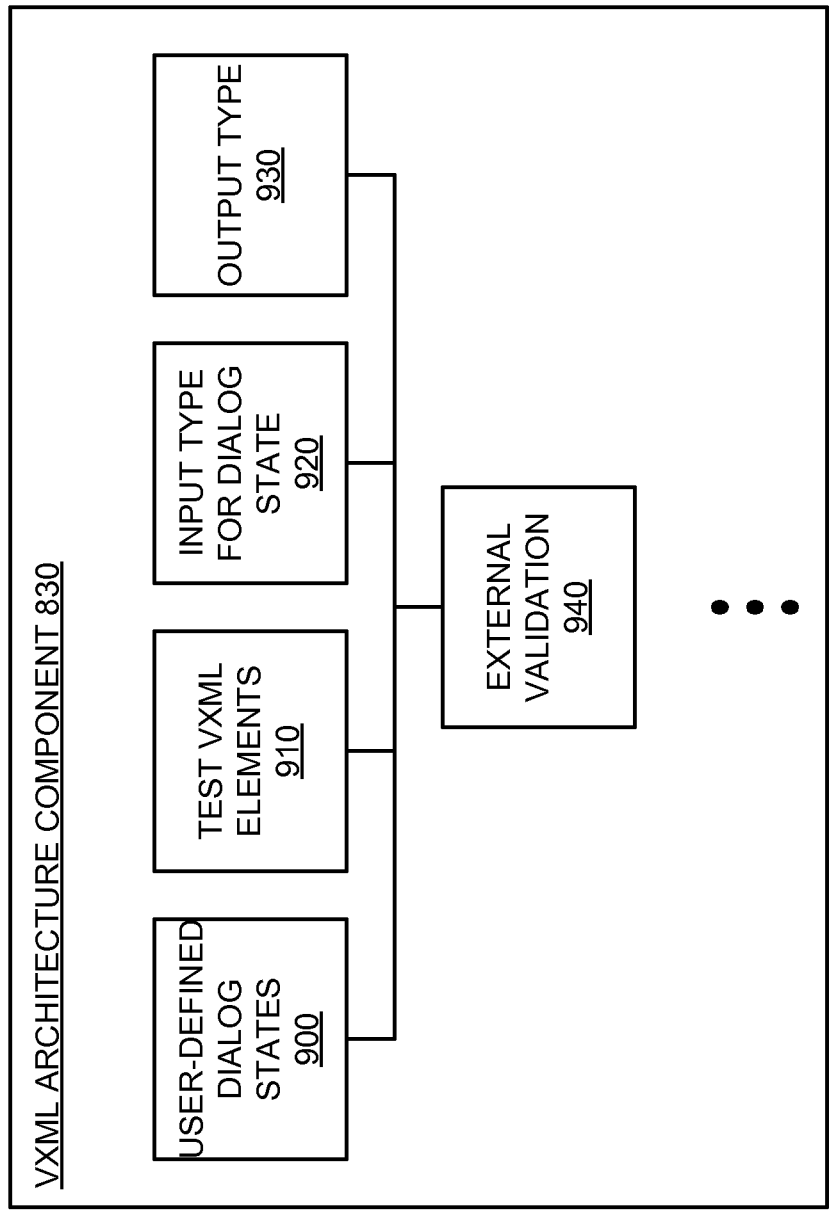
FIG. 9 is a functional diagram of a VXML architecture component of the testing/QA component of FIG. 8.

FIG. 9 is a functional diagram of VXML architecture component 830 of testing/QA component 410. As shown, VXML architecture component 830 may include a variety of exemplary components, e.g., a user-defined dialog states component 900, a test VXML elements component 910, an input type for dialog state component 920, an output type component 930, an external validation component 940, etc.

User-defined dialog states component 900 may retrieve the dialog states defined by a user (e.g., first dialog state 620 and second dialog state 630) from data storage 800. User-defined dialog states component 900 may also keep track of the dialog states defined by the user and/or default dialog states (e.g., in situations where a user did not define a dialog state). For example, user-defined dialog states component 900 may track a starting dialog state, an ending dialog state, a number of dialog states to be tested, of number of user-defined dialog states, a number of default dialog states, etc.

Test VXML elements component 910 may retrieve VXML elements (e.g., VXML events 720 and other VXML elements 750) from data storage 800. Test VXML element component may also keep track of and perform testing/QA on the VXML elements for each dialog state provided by user-defined dialog states component 900. For example, test VXML elements component 910 may perform testing/QA of global VXML elements for all dialog states, of user-defined VXML elements for each dialog state, and/or of default VXML elements for each dialog state. Test VXML elements component 910 may further order the VXML elements to be tested by testing/QA component 410.

As described above, the input type for a dialog state may be user-defined or provided (e.g., for default dialog states) in the form of synthetic speech. Input type for dialog state component 920 may retrieve the inputs for the dialog states from data storage 800, and keep track of the retrieved inputs. Input type for dialog state component 920 may provide a corresponding input for a dialog state to the IVR application when the IVR application activates the dialog state. For example, component 920 may provide a corresponding input that is user-defined, a default, or both. In another implementation, component 920 may provide a corresponding input that is user-defined, and may determine if the input is correct, incorrect, or both. For example, if the grammar in a dialog state is defined for a type of flower (e.g., the grammar is defined as a rose, a tulip, etc.), component 920 may determine whether the user has provided speech input type for both a rose and a tulip. In another example, component 920 may determine whether the user has provided the location of an incorrect speech input (e.g., sunflower) for the dialog state. In still another implementation, component 920 may determine whether the user defined a default synthetic speech input type for the dialog state (e.g., the default input type should be in a male voice or a female voice).

Output type component 930 may generate user-defined or default testing/QA results. For example, output type component 930 may generate testing/QA results in a variety of formats (e.g., Hypertext Markup Language (HTML), text file, etc.). In another example, output type component 930 may generate a variety of testing/QA results, such as, error outputs (e.g., VXML element errors such as noinput max errors, nomatch max errors, help max errors, etc.), missing prompts outputs, exception outputs, a logging level, a default output type, etc.

External validation component 940 may define and interact with external systems and/or services that may validate testing/QA results. For example, if an IVR application requests that results be validated by a third party via a web-based service, external validation component 940 may provide the necessary details about the web-based service. External validation component 940 may interact with a variety of external systems/services, such as, web-based services (e.g., customized, soap protocol, etc.), database systems (e.g., relational database management systems, object oriented database management systems, etc.), enterprise systems (e.g., Enterprise Java Beans), a Common Object Request Broker Architecture (CORBA), etc.

Although FIG. 9 shows exemplary components of VXML architecture component 830, in other implementations, fewer or more components than depicted in FIG. 9 may be provided for VXML architecture component 830.

Figure 10:
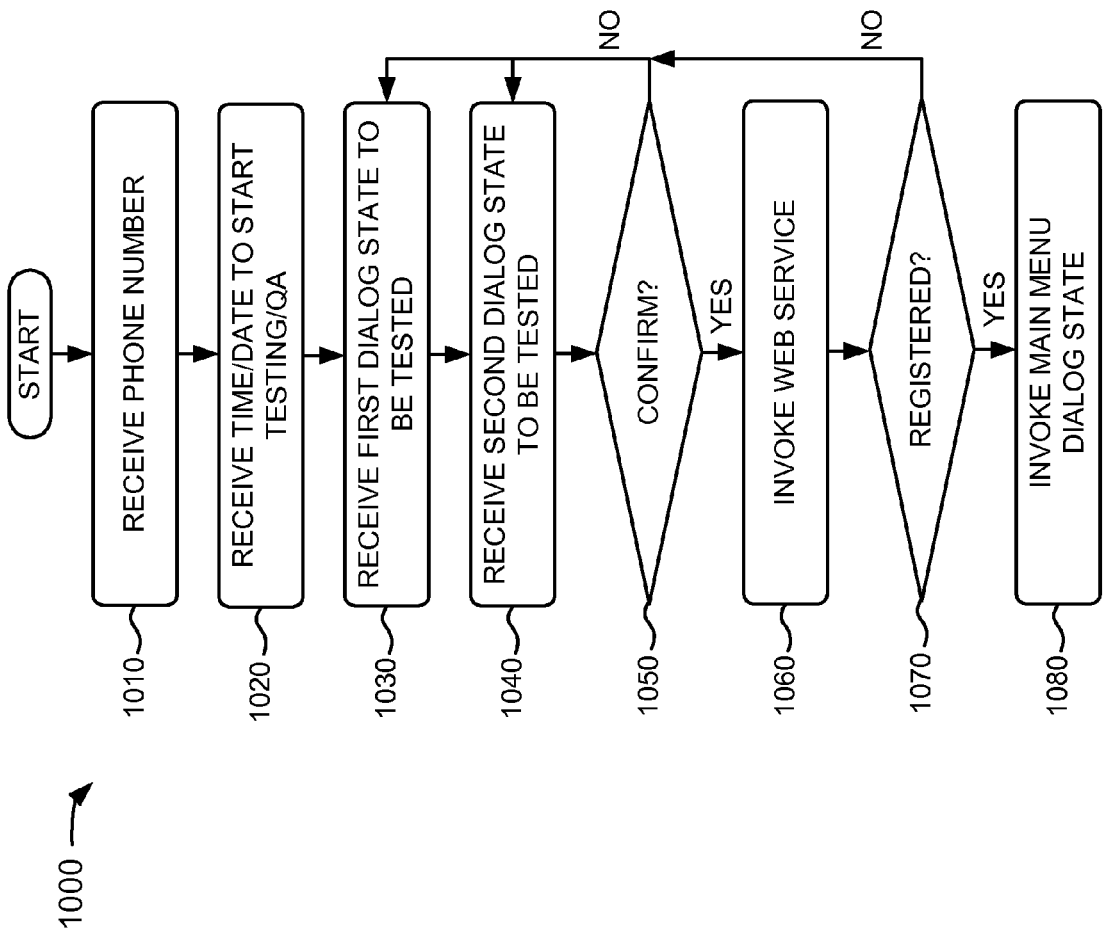
FIGS. 10 and 11 are flowcharts of exemplary processes for receiving conditions for performing testing/QA of an IVR application.
Figure 11:
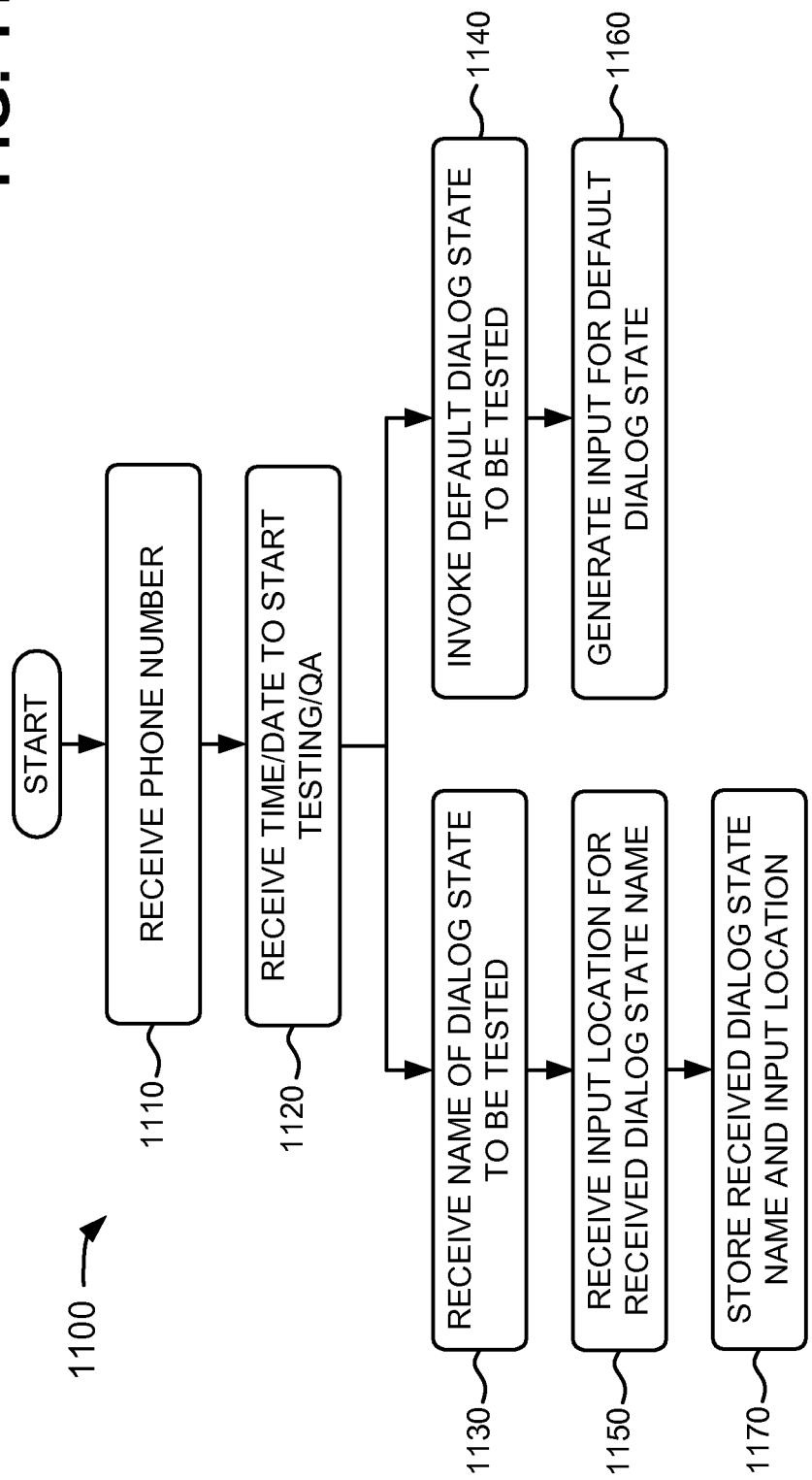

FIGS. 10 and 11 are flowcharts of exemplary processes for receiving conditions for testing/QA of an IVR application. FIG. 10 shows an exemplary process 1000 for receiving call flow diagram conditions for performing testing/QA of an IVR application. As shown in FIG. 10, process 1000 for receiving call flow diagram conditions may begin with the receipt of a telephone number to call for testing and/or QA of an IVR application (block 1010). For example, in one implementation described above in connection with FIG. 6, phone number input 600 may include the telephone number to call for testing and/or QA of an IVR application. In other words, the telephone number may provide access to the IVR application. A user may provide phone number input 600, and testing/QA component 410 may call the telephone number provided by phone number input 600 in order to access the IVR application and perform testing/QA thereon.

Process 1000 may receive a time and/or a date to start testing and/or QA of the IVR application (block 1020). For example, in one implementation described above in connection with FIG. 6, date/time input 610 may include a date and/or a time indicating when to start testing and/or QA of the IVR application. A user may provide date/time input 610, and testing/QA component 410 may perform testing/QA of the IVR application at the date and/or time specified by date/time input 610.

As further shown in FIG. 10, process 1000 may receive a first dialog state of the IVR application to be tested (block 1030). For example, in one implementation described above in connection with FIG. 6, first dialog state 620 may include a first dialog state of the IVR application for testing/QA. A user may provide first dialog state 620 of the IVR application (e.g., "MainMenuOfficer" may be a first dialog state where the user wants an automatic speech input of "Enroll Officer"), and testing/QA component 410 may speech input "Enroll Officer" when first dialog state 620 of the IVR application is accessed.

Process 1000 may receive a second dialog state of the IVR application to be tested (block 1040). For example, in one implementation described above in connection with FIG. 6, second dialog state 630 may include a second dialog state of the IVR application for testing/QA. A user may provide second dialog state 630 of the IVR application (e.g., "EntryOfficerId" may be a second dialog state where the user wants an automatic input of digits for "officer identification"), and testing/QA component 410 may input a predetermined number of digits (e.g., as defined by the user) when second dialog state 630 of the IVR application is accessed. Although FIG. 10 shows receipt of two dialog states (e.g., first and second dialog states), in other implementations, process 1000 may receive any number of dialog states.

As further shown in FIG. 10, process 1000 may automatically confirm whether the received information is correct (block 1050). If the received information is not correct (block 1050—NO), process 1000 may return to block 1030 or block 1040 and request receipt of correct information. For example, in one implementation described above in connection with FIG. 6, auto confirm 650 may include a mechanism to automatically confirm whether input information (e.g., provided by testing/QA component 410) is correct. Testing/QA component 410 may automatically input the digits for the second dialog state "EntryOfficerId," and auto confirm 650 may automatically confirm whether the digits are correct. If auto confirm 650 determines that the digits are incorrect, testing/QA component 410 may return to second dialog state 630 and may request re-input of the digits for the second dialog state "EntryOfficerId."

If the received information is correct (block 1050—YES), process 1000 may receive information (e.g. an IP address) for invoking a web service (block 1060). For example, in one implementation described above in connection with FIG. 6, web service 660 may include a mechanism to invoke a web service, if requested by the user, for validation. Testing/QA component 410 may invoke web service 660 to determine whether the digits entered in the second dialog state "EntryOfficerId" is "registered" or "not registered" with the IVR application.

As further shown in FIG. 10, process 1000 may determine if a received dialog state is registered (block 1070). If the dialog state is not registered (block 1070—NO), process 1000 may return to block 1030 or block 1040 and request receipt of a registered dialog state. For example, in one implementation described above in connection with FIG. 6, web service 660 may determine if a received dialog state is registered. If web service 660 determines that the second dialog state "EntryOfficerId" is "not registered," testing/QA component 410 may return to second dialog state 630 and may request re-entry of the digits for the second dialog state "EntryOfficerId."

If the dialog state is registered (block 1070—YES), process 1000 may receive information for invoking a main menu dialog state (block 1080). For example, in one implementation described above in connection with FIG. 6, if web service 660 determines that the second dialog state "EntryOfficerId" is "registered," testing/QA component 410 may invoke main menu dialog state 670. In another implementation described above in connection with FIG. 6, main menu dialog state 670 may include a main menu dialog state of the IVR application. For example, the main menu dialog state may request user identification information (e.g., account information, user name, a personal identification number (PIN), etc.).

FIG. 11 shows an exemplary process 1100 for receiving dialog states conditions for performing testing/QA of an IVR application. As shown in FIG. 11, process 1100 for receiving dialog states conditions may begin with the receipt of a telephone number to call for testing and/or QA of an IVR application (block 1110). For example, in one implementation described above in connection with FIG. 7, phone number input 700 may include the telephone number to call for testing and/or QA of an IVR application. In other words, the telephone number may provide access to the IVR application. A user may provide phone number input 700, and testing/QA component 410 may call the telephone number provided by phone number input 700 in order to access the IVR application and perform testing/QA thereon.

Process 1100 may receive a time and/or a date to start testing and/or QA of the IVR application (block 1120). For example, in one implementation described above in connection with FIG. 7, date/time input 710 may include a date and/or a time indicating when to start testing and/or QA of the IVR application. For example, a user may provide date/time input 710, and testing/QA component 410 may perform testing/QA of the IVR application at the date and/or time specified by date/time input 710.

As further shown in FIG. 11, process 1100 may receive either a name of a dialog state to be tested (block 1130) or may invoke a default dialog state to be tested (block 1140). For example, in one implementation described above in connection with FIG. 7, the user may have the option of inputting a name of a dialog state where testing/QA component 410 may begin testing/QA of the IVR application. In one example, the user may provide the name of VXML events 720, grammar 730, correct input 740, other VXML elements 750, etc. VXML events 720 may include the names of VXML events (e.g., noinput, nomatch, help, etc.) for testing/QA by component 410. Grammar 730 may include user-defined grammar to be used for a dialog state. Correct input 740 may include user-defined correct input for a dialog state. Other VXML elements 750 may include any of the VXML elements defined previously and/or other XML elements used in an IVR application. If no name for a dialog state is provided by a user, testing/QA component 410 may start from a default first dialog state reached by calling the telephone number provided by phone number input 700.

If the name of a dialog state is received in block 1130, process 1100 may receive an input location for the received dialog state name (block 1150). For example, in one implementation described above in connection with FIG. 7, the user may specify, via interface 400, the location of an input (e.g., the names of audio files to be used for a nomatch events, noinput events, etc.) for VXML events 720. In other implementations, the user may specify, via interface 400, the location of an input (e.g., where a recorded input is stored) for grammar 730, correct input 740, and/or other VXML elements 750.

If the default dialog state is invoked in block 1140, process 1100 may generate an input type for the default dialog state (block 1160). For example, in one implementation described above in connection with FIG. 7, if the user does not specify the name of a dialog state (e.g., VXML events 720) to be tested, testing/QA component 410 may provide synthetic speech as the input for the default dialog state.

Process 1100 may store the name of the received dialog state to be tested and the input location for the received dialog state name, if a name and/or input have been received (block 1170). For example in one implementation described above in connection with FIG. 8, data storage component 800 may include any memory device (e.g., main memory 230, read only memory (ROM) 240, and/or storage device 250 of device 200), and may provide storage for the testing/QA conditions provided by a user via interface 400.

Figure 12:
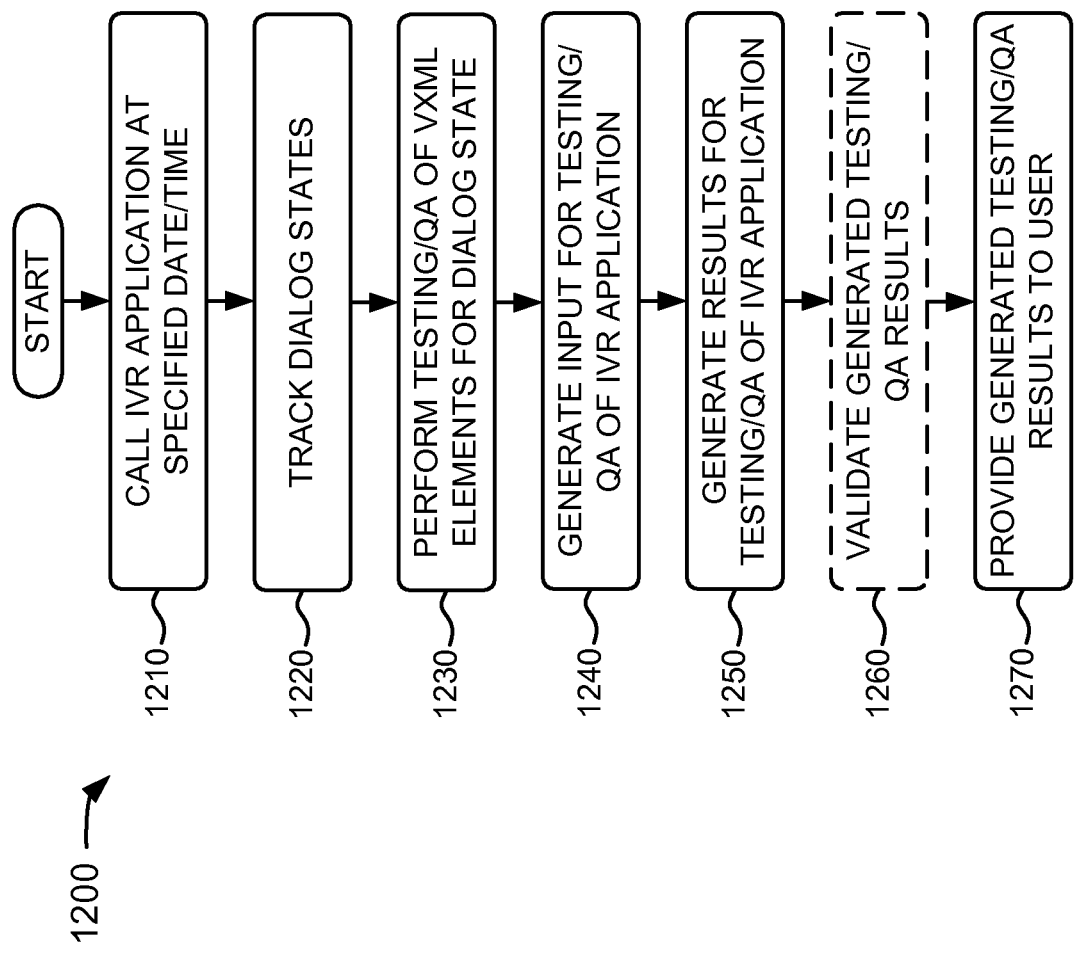
FIG. 12 is a flowchart of an exemplary process for automatic testing and/or QA of an IVR application.

FIG. 12 is a flowchart of an exemplary process 1200 for automatic testing and/or QA of an IVR application. Process 1200 may begin by calling a telephone number of an IVR application at a specified date and/or time (block 1210). For example, in one implementation described above in connection with FIG. 8, date/time component 810 may begin performance of testing/QA of an IVR application at the provided date and time. If testing/QA component 410 begins testing/QA of the IVR application on the date and/or time as specified by date/time component 810, call number component 820 may retrieve the telephone number to be called for the IVR application (e.g., phone number input 600 or 700) from data storage 800. Call number component 820 may also initiate the telephone call to the IVR application using the retrieved telephone number.

Process 1200 may track dialog states to be tested for an IVR application (block 1220). For example, in one implementation described above in connection with FIG. 9, user-defined dialog states component 900 may retrieve the dialog states defined by a user (e.g., first dialog state 620 and second dialog state 630) from data storage 800, and may keep track of the dialog states defined by the user and/or default dialog states (e.g., in situations where a user did not define a dialog state).

Process 1200 may perform testing/QA of VXML elements of a dialog state (block 1230). For example, in one implementation described above in connection with FIG. 9, test VXML elements component 910 may retrieve VXML elements (e.g., VXML events 720 and other VXML elements 750) from data storage 800, and may perform testing/QA on the VXML elements for each dialog state provided by user-defined dialog states component 900.

As further shown in FIG. 12, process 1200 may generate input(s) for performing testing and/or QA of the IVR application (block 1240). For example, in one implementation described above in connection with FIG. 9, input type for dialog state component 920 may retrieve the inputs for the dialog states from data storage 800, and may provide a corresponding input for a dialog state to the IVR application when the IVR application activates the dialog state. Component 920 may provide a corresponding input that is user-defined, a default, or both. In another implementation, component 920 may provide a corresponding input that is user-defined, and may determine if the input is correct, incorrect, or both. In still another implementation, component 920 may determine whether the user defined a default input type for the dialog state (e.g., the default input type should be in a male voice or a female voice).

Process 1200 may generate results of the testing/QA of the IVR application (block 1250). For example, in one implementation described above in connection with FIG. 9, output type component 930 may generate user-defined or default testing/QA results. In one example, output type component 930 may output testing/QA results in a variety of formats (e.g., Hypertext Markup Language (HTML), text file, etc.). In another example, output type component 930 may generate a variety of testing/QA results, such as, error outputs (e.g., VXML element errors such as noinput max errors, nomatch max errors, help max errors, etc.), missing prompts outputs, exception outputs, a logging level, a default output type, etc.

As further shown in FIG. 12, process 1200 may (optionally) validate the generated testing/QA results (block 1260). For example, in one implementation described above in connection with FIG. 9, external validation component 940 may define and interact with external systems and/or services that may validate results of the testing/QA. In one example, if an IVR application requests that results be validated by a third party via a web-based service, external validation component 940 may provide the necessary details about the web-based service.

Process 1200 may provide the generated testing/QA results to a user (block 1270). For example, in one implementation described above in connection with FIG. 8, notification component 850 may provide notification of the results of the testing/QA of the IVR application as determined by testing/QA component 410. Notification component 850 may provide such notification in a variety of ways (e.g., via an email, a voicemail, a telephone call, a page, a text message (e.g., instant message (IM) or short message service (SMS)), a facsimile, etc.). The user may specify the level of detail provided in the notification. The notification, for example, may selectively provide a record of every transaction performed on the IVR application, a record of problems that were encountered during the testing/QA of the IVR application, and/or an indication of whether or not the testing/QA of the IVR application was successful.

Implementations described herein may provide systems and methods for automatic testing and/or QA of an IVR application. For example, in one implementation, a telephone number to be called for accessing the IVR application, and a date and/or time to start testing/QA of the IVR application may be provided (e.g., by a user) into a system for testing and/or QA of an IVR application. Conditions for testing/QA of the IVR application may also be provided to the system. The conditions may be provided by using a call flow diagram, and/or by providing the name of each dialog state. VXML elements to be tested for each dialog state of the IVR application may be pre-defined and provided to the system. The system may call the provided phone number and may automatically perform testing and/or QA. The system may generate a log of any issues encountered during testing/QA of the IVR application, and may notify (e.g., the user) of the testing/QA results of the IVR application.

The foregoing description of preferred embodiments provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 10-12, the order of the acts may be modified in other implementations consistent with principles of the invention. Further, non-dependent acts may be performed in parallel.

Embodiments of the invention, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a computing device and for an interactive voice response (IVR) application, conditions that include information regarding one or more voice extensible markup language (VXML) elements associated with a dialog state, of the IVR application, that is to be reviewed during a testing of the IVR application;
performing, by the computing device, the testing of the IVR application based on the conditions;
generating, by the computing device, test results based on the testing of the IVR application; and
providing, by the computing device, a notification regarding the test results.

2. The method of claim 1, where the conditions further include at least one of:
information regarding a telephone number to call for the testing the IVR application,
information regarding a date indicating when to start the testing of the IVR application,
information regarding a time indicating when to start the testing of the IVR application, or
information regarding a message to be played when a predetermined error condition occurs during the testing of the IVR application.

3. The method of claim 1, where the conditions further include at least one of:
information regarding grammar to be used for the testing of the dialog state, or
information regarding user-defined correct input to be used for the testing of the dialog state.

4. The method of claim 1, where the conditions include at least one of a user-defined condition or a default condition.

5. The method of claim 4, where, when the conditions include the user-defined condition, performing the testing of the IVR application comprises:
receiving an input for the user-defined condition, and
testing the IVR application based on the user-defined condition and the input.

6. The method of claim 1, where performing the testing of the IVR application comprises:
accessing the IVR application,
retrieving the conditions for the IVR application,
generating inputs for performing the testing based on the conditions, and
performing the testing by determining whether the IVR application is functioning correctly based on responses of the IVR application to the inputs.

7. The method of claim 1, where the test results include at least one of an error output, a missing prompt output, an exception output, a logging level, or a default output type.

8. The method of claim 1, further comprising:
validating the test results after generating the test results.

9. The method of claim 8, where validating the test results comprises:
validating the test results by accessing a third party system or service.

10. The method of claim 1, where providing the notification comprises:
providing the notification via at least one of an email, a voicemail, a telephone call, a page, or a text message.

11. A system comprising:
one or more processors to:
receive conditions that include information regarding one or more voice extensible markup language (VXML) elements to be tested for a dialog state of an interactive voice response (IVR) application to be tested,
perform a test of the IVR application based on the conditions,
generate test results based on the test of the IVR application, and
provide a notification regarding the test results.

12. The system of claim 11, where, when performing the testing of the IVR application, the one or more processors are to:
access the IVR application by calling a telephone number specified by the conditions,
generate an input for the dialog state,
provide the input to the IVR application when the dialog state is accessed during the testing of the IVR application, and
determine whether the IVR application is functioning correctly based on a response provided by the IVR application to the input.

13. The system of claim 11, where, when performing the testing of the IVR application, the one or more processor are to:
generate inputs for the testing of the IVR application, and
perform the testing of the IVR application based on the inputs and the conditions.

14. The system of claim 11, where the conditions further include at least one of:
information regarding a telephone number to call for the testing the IVR application,
information regarding a date indicating when to start the testing of the IVR application,
information regarding a time indicating when to start the testing of the IVR application, or
information regarding a message to be played when a predetermined error condition occurs during the testing of the IVR application.

15. The system of claim 11,
where the conditions further comprise:
information regarding a date and a time to start the testing of the IVR application, and
information regarding a telephone number for accessing the IVR application, and
where, when performing the testing of the IVR application, the one or more processors are to:
call the telephone number based on the date and the time, and
perform the testing of the IVR application after calling the telephone number.

16. The system of claim 11, where, when performing the testing of the IVR application, the one or more processors are to:
track the dialog state,
retrieve the one or more VXML elements for the dialog state,
retrieve inputs corresponding to the dialog state based on the one or more VXML elements, and
provide, based on the tracking of the dialog state, the inputs to the IVR application when the IVR application activates dialog state.

17. The system of claim 16, where the inputs include synthetic speech.

18. A non-transitory computer-readable medium storing instructions, the instructions comprising:
one or more instructions that, when executed by one or more processors, cause the one or more processors to:

receive, for an interactive voice response (IVR) application, conditions that include information regarding one or more voice extensible markup language (VXML) elements associated with a dialog state that is to be reviewed during a testing of the IVR application;

perform the testing of the IVR application based on the conditions;

generate test results based on the testing of the IVR application; and provide a notification regarding the test results.

19. The non-transitory computer-readable medium of claim 18, where the one or more instructions to perform the testing of the IVR application comprise:

one or more instructions that, when executed by the one or more processors, cause the one or more processors to:
access the IVR application,
retrieve the conditions for the IVR application,
provide, based on the conditions, inputs to the IVR application when the dialog state is accessed during the testing of the IVR application, and
determine whether the IVR application is functioning correctly based on responses of the IVR application to the inputs.

20. The non-transitory computer-readable medium of claim 18, where the notification includes at least one of:

information regarding transaction performed during the testing of the IVR application, information regarding problems that were encountered during the testing of the IVR application, or information that indicates whether the testing of the IVR application was successful.

* * * * *